United States Patent [19]

Duggan

[11] Patent Number: 4,776,035
[45] Date of Patent: Oct. 4, 1988

[54] LOCKUP DETECTION AND AVOIDANCE SCHEME FOR SATELLITE COMMUNICATION NETWORK

[75] Inventor: Gerald S. Duggan, Indialantic, Fla.

[73] Assignee: Harris Corp., Melbourne, Fla.

[21] Appl. No.: 798,246

[22] Filed: Nov. 8, 1985

[51] Int. Cl.⁴ .............................................. H04B 1/00
[52] U.S. Cl. ......................................... 455/69; 455/9; 455/10; 455/52; 342/82
[58] Field of Search ....................... 455/10, 12, 69, 52, 455/9, 70; 342/82

[56] References Cited

U.S. PATENT DOCUMENTS

| | | | |
|---|---|---|---|
| 3,315,164 | 4/1967 | Ferguson, Jr. et al. | 455/69 |
| 3,732,496 | 5/1973 | Boyer | 455/69 |
| 4,038,600 | 7/1977 | Thomas | 455/12 |
| 4,228,538 | 10/1980 | Scharla-Nielsen | 455/12 |
| 4,261,054 | 4/1981 | Scharla-Nielsen | 455/69 |

*Primary Examiner*—Robert L. Griffin
*Assistant Examiner*—Elissa Seidenglanz
*Attorney, Agent, or Firm*—Antonelli, Terry & Wands

[57] ABSTRACT

A mechanism for avoiding satellite transponder TWT saturation in an ALPC communication network detects the onset of a lockup condition through an avalanche detector. In response to avalanche detection, those links which have been identified as participating in a downlink fade have their ALPC attenuator settings placed at a minimum level, so that the operating point of the transponder TWT may be reduced below the avalanche threshold. Thereafter, as the fade recedes, those units whose ALPC attenuators have minimum power settings may be restored to normal operation. Because the orderwire which couples link quality data from a received terminal monitor unit to transmitter attenuator control units through the avalanche detection and recovery scheme may itself be impacted by a downlink fade, the foregoing scheme is augmented by a lockup detection and avoidance mechanism through which recovery from an actual lockup may take place. Transmit and receive terminal data is monitored and prescribed signal quality and ALPC attenuator setting data are correlated with one another. When a lockup condition has been detected, all of the links are effectively turned off to permit the TWT to recover from its saturation condition. Thereafter, those links which have not been identified as being in the path of a downlink fade are restored to normal service. When the fade recedes, those links which have had their power settings minimized for the presence of the fade are restored.

69 Claims, 5 Drawing Sheets

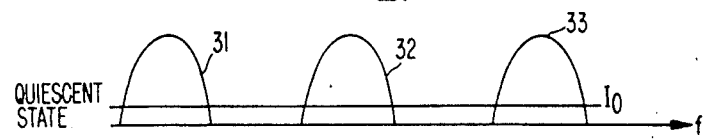
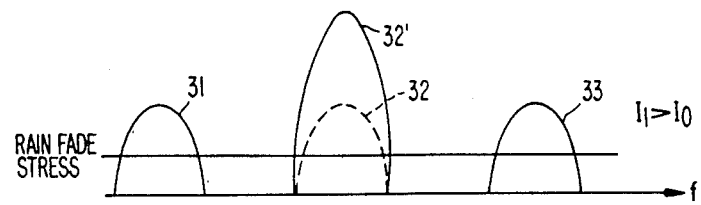
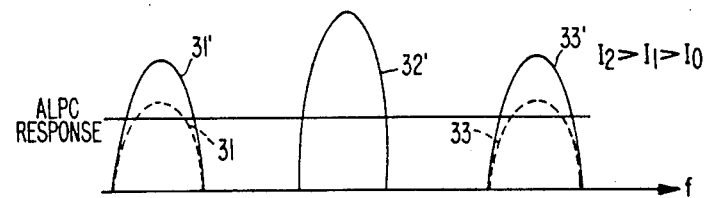
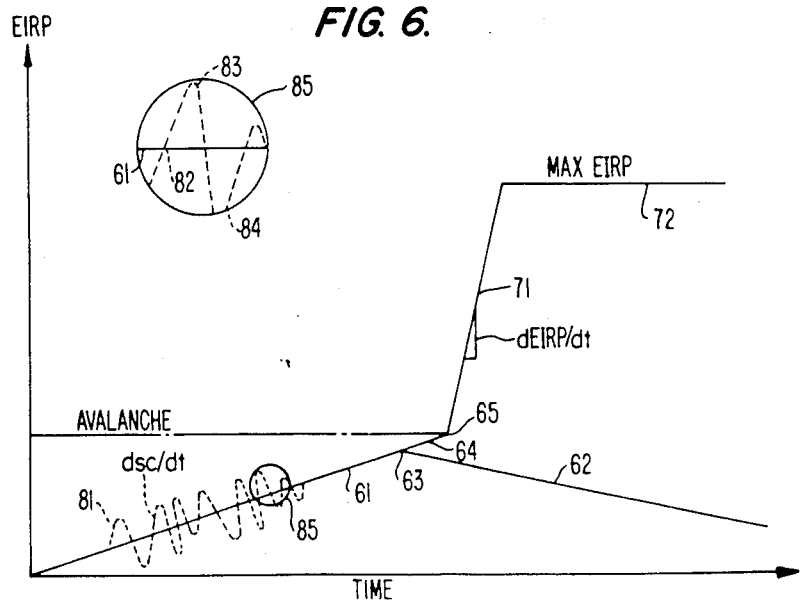

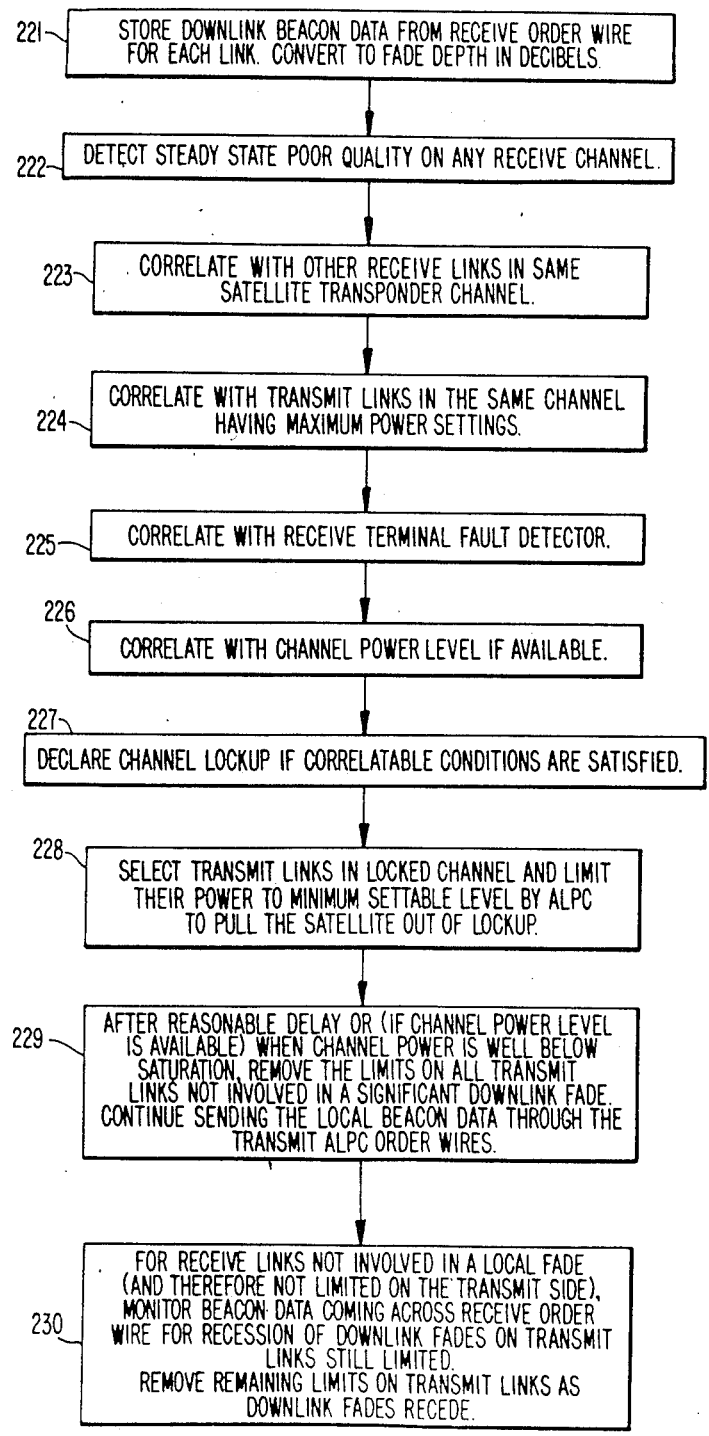

LOCKUP DETECTION AND AVOIDANCE SCHEME FOR SATELLITE COMMUNICATION NETWORK

FIELD OF THE INVENTION

The present invention relates to satellite communication systems and is particularly directed to a scheme for use in an adaptive link power control (ALPC) network for detecting the onset of a transponder channel lockup condition (satellite TWT saturation) and providing recovery from such a condition before it occurs. Moreover, this saturation avoidance scheme is augmented by a lockup recovery mechanism, through which the network may recover from an actual transponder channel lockup condition, thereby providing an additional margin performance for maximizing the operational status of the links of the satellite channel.

BACKGROUND OF THE INVENTION

As communication networks have expanded and diversified to meet the needs of a variety of subscriber/users, the continued successful operation of relay satellites, which constitute a critical component of each network link, has continued to draw increasing attention, especially with respect to the matter of power allocation among the links. In order for any relay link to operate successfully over a variety of link conditions, i.e. to accommodate changing levels of signal attenuation caused, for example, by rainfall between the relay satellite and the earth station, the satellite TWT power allocated to each downlink terminal is tailored to provide a prescribed degree of excess power (rain fade margin). Typically, this power differential may be on the order of 6 dB higher than that required to close the link in clear weather. Because heavy rainfall is infrequent and all terminals do not experience rainfall simultaneously, this rain fade margin is wasted most of the time.

In an effort to circumvent this highly inefficient allocation of effectively unused excess power, adaptive link power control (ALPC) schemes such as described in U.S. Pat. Nos. 4,261,054 to Scharla-Nielsen and 4,228,538 to Scharla-Nielsen et al and assigned to the Assignee of the present application, have been proposed. In an ALPC satellite network, each link monitors its received signal quality and sends appropriate power control commands to the transmitter terminal in an attempt to maintain desired link performance during rain fades. In response to these power control commands, the uplink transmitter causes power to be drawn from a common or shared power pool that is normally held in reserve in the satellite TWT until it is actually required by individual downlinks. Because of the statistical nature of the occurrence and intensity of rain fades, the size of this power pool or rain margin in the TWT is considerably less than the above-referenced 6 dB figure, so that the ALPC satellite network can support more terminals and/or higher data throughput. Now although the ALPC approach offers a reduction in wasted power and thereby an improvement in throughput capacity, it subjects the network to a potential "lockup" condition.

More particularly, should the power in a satellite channel (which may be shared by a number of users) increase to the non-linear portion of its TWT power transfer characteristic, due to the pervasive action of ALPC links responding to downlink fades, the intermodulation products (intermods) between signals in the satellite TWT generate an effective increase in the apparent noise level in the channel. To offset this increase in noise level, the ALPC mechanism increases the power transmitted by the uplink transmitter, resulting in increased satellite TWT power which, in turn, further increases the intermod noise seen by each link. Along the TWT power transfer characteristic there is a threshold (or "avalanche point") beyond which an increase in signal power cannot compensate for the increase in intermod noise produced by the signal and the ALPC mechanism will drive the channel into saturation. Once the channel has been driven into saturation, ALPC will hold it there forever if no external escape mechanism is provided to undo this "lockup" condition (the channel is "locked-up" in saturation by ALPC).

Not only do all users of the locked-up channel suffer poor performance for the duration of this condition, but once avalanche is reached, it is normally only a matter of seconds before the entire system goes into lockup due to the influence of ALPC. Moreover, during the lockup condition, the deterioration of performance in the control link can be severe enough to make recovery very difficult and time consuming (especially if the control link is also involved in the fade that caused the lockup condition).

SUMMARY OF THE INVENTION

In accordance with the present invention there is provided a mechanism for avoiding the above-mentioned lockup condition caused by downlink fades in the presence of ALPC while still providing required link performance to all links outside of the fade. For this purpose, rate of change of power output of the satellite earth terminal is continuously monitored for the onset of the above-mentioned "avalanche condition", by comparing power rate of change to a prescribed threshold. If the threshold is exceeded a power control circuit places an upper limit on available link power close to but less than the "avalanche" threshold value. As a result link power cannot be increased beyond avalanche so that lockup is prevented.

Those links which have been determined, by comparing a downlink beacon to a threshold, to be participants in the downlink fade are removed from service until the fade recedes. For this purpose, those links that have been determined to have caused the channel to be driven to avalanche are effectively subdued by reducing their transmitted power to a minimum value, so that the remainder of the network communication links (those outside the fade) can be restored to normal service. Once the fade has diminished, the power limit on the subdued link(s) is removed and normal service is restored by ALPC.

As a further aspect of the invention there is provided a mechanism for detecting lockup condition caused by downlink fades and for recovering from this lockup condition, irrespective of the presence of the above-referenced lockup avoidance and fade recovery scheme. Pursuant to this feature of the invention, the signal quality of all receive links and ALPC attenuation settings on all transmit links are continuously monitored at a terminal under ALPC control. If all receive links from a particular satellite transponder channel simultaneously exhibit poor steady state signal quality, as determined by sampling ALPC quality monitors, and if the terminal has no other reported receiver faults that are common to the receive links in question, and if all ALPC transmit attenuators in the satellite channel are set at their maximum power limits, the channel is declared to be in a lockup condition.

When a lockup condition is declared, the power from all transmit links in the locked channel is limited to a minimum level by ALPC; with all terminals acting concurrently this action will pull the satellite out of lockup. After a prescribed delay, those transmit links not declared to be participants in a significant downlink fade having their power restrictions removed by ALPC. Then, as the downlink fade recedes, the remainder of the ALPC attenuator minimum limits are removed.

BRIEF DESCRIPTION OF THE DRAWINGS

FIGS. 2-4 show respective radiated power characteristics of a satellite transponder TWT over a prescribed bandwidth;

FIG. 6 is a graphical illustration of the relationship between effective irradiated RF power (EIRP) and time in an ALPC network;

FIG. 11 shows a flow chart of the signal processing mechanism executed by the lockup detection and recovery processor of the mechanism shown in FIG. 10.

DETAILED DESCRIPTION

Figure 1:
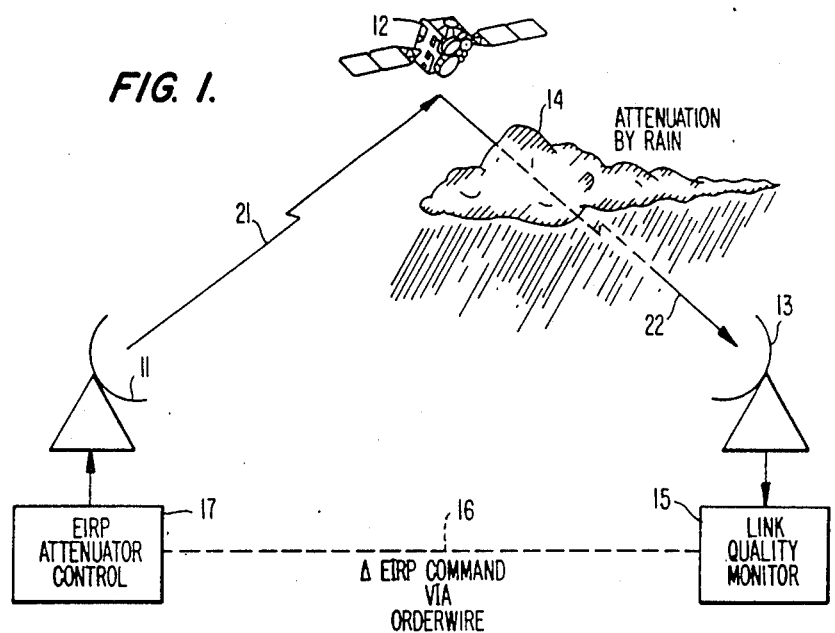
FIG. 1 is a diagram of a portion of a satellite communication network.

In order to facilitate an understanding of the lockup detection, avoidance and recovery mechanism of the present invention, it is useful to consider, initially, the composition and operation of an ALPC Network. Typically an ALPC network contains multiple earth stations that communicate with one another over multiple satellite links via a commonly shared satellite transponder, the links themselves having arbitrary connectivity. A portion (i.e. one link) of such a network is illustrated diagrammatically in FIG. 1 as containing an uplink, or transmitter, terminal 11 that communicates with a downlink, or receiver, terminal 13 via a satellite transponder 12. The communication link thus consists of an uplink channel 21 connecting transmitter terminal 11 and satellite transponder 12 and a downlink channel 22 connecting satellite transponder 12 and terminal 13. Downlink terminal 13 is coupled with a link quality monitor unit 15 which monitors the quality of signals received over downlink channel 22. On the basis of the measure of signal quality, corresponding to a comparison of received signal-to-noise ratio (in terms of bit rate bandwidth $Eb/No$) with a threshold $Eb/No_{Req.}$ required for maintaining a prescribed signal-to-noise ratio, a control signal is coupled from downlink terminal 13 over an orderwire link 16, separate from the satellite link, to an EIRP (effective irradiated RF power) attenuator control unit 17 at transmitter terminal 11, for adjusting, periodically, the level of the signal power transmitted from uplink terminal 11, in an effort to maintain downlink received signal quality at a prescribed level.

A source of significant degradation of such signal quality is a rain fade, represented in FIG. 1 by rain attenuation 14 in downlink channel 22. The presence of the rain attenuation will cause the signal quality measured at downlink terminal 13 to drop substantially from the prescribed acceptable level, whereby a command is transmitted from terminal monitor unit 15 over orderwire link 16 to control unit 17, instructing transmitter terminal 11 to increase its radiated signal power over channel 21 to satellite transponder 12. This action is illustrated in FIGS. 2-4 which show the manner in which an increase in radiated signal power from the travelling wave tube within the satellite transponder 12 is accompanied by an increase in the intermodulation products power I.

Referring to FIG. 2, the signal power characteristic for the traveling wave tube is shown as containing a plurality of (spaced apart in frequency) signal power characteristics 31, 32 and 33, respectively associated with separate communication channels, such as downlink channel 22 from satellite transponder 12 to downlink terminal 13, illustrated in FIG. 1, referenced above. For purposes of the present discussion, signal characteristic 32 is assumed to correspond to downlink channel 22. Within the transponder, an initial intermodulation product noise level $I_0$ (which will be described in detail below) is shown as superimposed on the radiated signal power characteristic.

As explained above, in response to a rain attenuation stress, transmitter terminal 12 sends a signal over uplink channel 21 causing the TWT within the satellite transponder 12 to increase the downlink power over channel 22, thereby increasing the signal output characteristic 32 of the TWT from that shown in FIG. 2 to new characteristic 32', shown in FIG. 3. However, the resulting increase in the TWT operating point, in turn, causes a higher intermodulation product power level $I_1 > I_0$ for all links and initiates a signal degradation (rain attenuation) response cycle.

Figure 5:
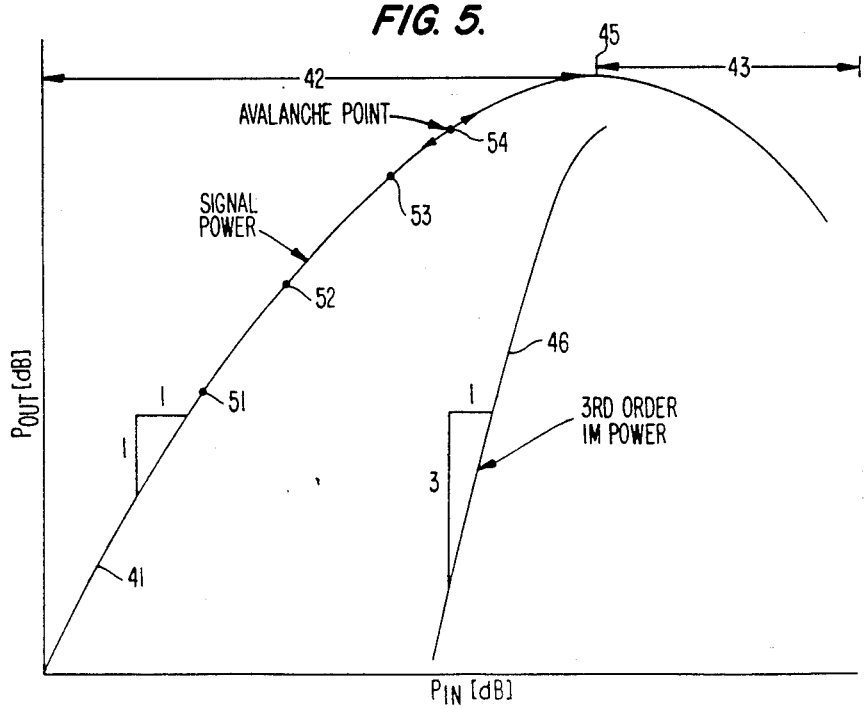
FIG. 5 shows the power output vs. power input characteristic of a satellite transponder TWT.

More particularly, with attention directed to FIG. 5, there is shown the power output vs. power input characteristic 41 of the travelling wave tube within the satellite transponder 12. Also shown is the third order intermodulation product characteristic 46 which has positive slope (3:1) region considerably greater than that (1:1) of an initially generally linear portion of power characteristic 41. As shown in FIG. 5, the overall characteristic 41 is nonlinear, increasing with a positive slope, over a first region 42, and decreasing thereafter from a peak level 45 over a region 43. As noted above, for lower values of input power, the output vs. input characteristic 41 is substantially linear having approximately a 1:1 slope. In the event of a stress on one or more of the links (e.g. a rain fade attenuation on link 22 shown in FIG. 1), the transponder TWT output power will increase by a prescribed multiplicative factor to counteract the effect of the rain fade. This is considered to be a stress portion of a cycle of action to be taken by the system, since it is initiated by a rain fade stress.

Because part of the power generated within the travelling wave tube is embedded in intermodulation products, not only is there an increase in the radiated signal power, but there is an increase in the intermodulation product power level, represented in FIG. 5 by power characteristic 46. This is represented in FIG. 3, referenced above, by intermod power level $I_1 > I_0$, responding to the rain fade stress. As shown in FIG. 5, from an initial operating point 51, the signal output power of the travelling wave tube, in response to a rain fade stress, increases to a new level 52. The increase in power level causes an increase in the signal power transmitted over link 22 to counteract the effect of the rain fade attenuation 14, so that the signal characteristic over link 22 changes from characteristic 32 to 32', as shown in FIG. 2. As far as terminal station 13 is concerned, accordingly, a satisfactory increase in signal power has been initiated so as to counter the effect of the rain fade and terminal station 13 is now satisfied. However, when the transponder TWT was caused to increase its signal power output, there was a resulting increase in intermodulation product level, as mentioned above. This increase in intermodulation product power level, which affects all of the other links in the network, does not affect the received signal power of link 22.

More particularly, the downlink fade 14 which affected the received signal power at terminal station 13 also has attenuated the received intermodulation product power level $I_1$. As a result, the signal-to-noise ratio at terminal station 13 is still at an acceptable level. For all other links on the network, however, the increase in intermodulation product power level has caused a decrease in the signal-to-effective noise ratio at the respective receiver terminal stations. Accordingly, other receiver terminal stations will initiate an adaptive link power control action causing their respective transmitters to take steps to increase the radiated signal power from the transponder TWT. This increase in signal power level for the other links is shown in FIG. 4 by the respective increases in signal characteristics 31 and 33 to 31' and 33', respectively. In FIG. 5, the corresponding increase in TWT power level is shown as a change in power level from operating point 52 to operating point 53. This increase in operating point level causes an increase in the radiated signal power for the affected link by some amount $\Delta$ to compensate for the fade stress $\Delta' = \Delta$. Accordingly, the resulting signal-to-effective noise ratio value at terminal 13 is approximately the same as prior to the fade, but the signal to intermodulation product power level value is larger by about $\Delta$. (Recall that effective noise is the sum of thermal noise and intermodulation product power.) It can be seen, therefore, that increases in the radiated intermodulation product power noise density affect the rain faded link 22 to a much smaller extent than the other links. The values of $\Delta$ and $\Delta'$ are not quite equal to each other since the improved value of signal to intermodulation product power level implies that the signal-to-thermal noise ratio need not be quite as large as prior to the fade in order to achieve a required value of signal to (noise plus intermodulation product) ratio.

Within the travelling wave tube of the satellite transponder 12, however, the output operating point has moved closer to saturation level. With an increase in the intermodulation product power level to the new level $I_2 > I_1 > I_0$, all of the links of the network will detect a decrease in the signal-to-noise ratio level and again initiate an adaptive link power control response cycle, causing the operating point to again shift to a higher operating level. This action continues to take place repeatedly until eventually the transponder TWT amplifier reaches an "avalanche" point 54 beyond which further increases in TWT power drive the TWT into an instability region and the TWT rapidly reaches its saturation level 45; beyond this level any further attempts to increase signal power actually cause a decrease in the signal power over region 43.

Summarizing the above, for operating points on characteristic 41 that are sufficiently close to saturation level 45, increasing the output power yields a worse performance for each signal received over any link in the network, since the intermodulation product power increases faster than the signal power. Thus, for every 1 dB increase in operating point, the signal-to-thermal noise ratio (S/N) improves 1 dB, but the signal-to-intermodulation noise ration (S/I) becomes worse by 2 dB. The result is that the effective signal-to-noise ratio degrades in that the intermodulation product power noise level is comparable to the thermal noise level at the receiving terminal. When this occurs, all links request more power and the system races to a "lockup" condition.

As described briefly above, pursuant to a first aspect of the present invention, there is provided a mechanism (avalanche detector) for detecting the onset of the lockup condition and upon detecting that onset, taking steps to limit transmitted uplink power, for those links that have been identified as being involved in a downlink fade, until the fade recedes. According to a second aspect of the invention, the first aspect is augmented by a lockup recovery mechanism through which the network may recover from an actual transponder lockup condition, irrespective of the avalanche detection and recovery scheme of the first aspect of the invention, thereby providing an additional margin of performance for optimizing the operational status of the links of the satellite communications channel. Each of these aspects of the invention are described in detail below.

Avalanche Detector

Before describing, in detail, the signal analysis and processing sequence by way of which the avalanche detector mechanism of the present invention monitors the channel for onset of a lockup condition, it is useful to consider the characteristics of the process through which power to the satellite is controlled by ALPC. For this purpose attention is directed to FIG. 6 which shows the variation with time of EIRP (effective irradiated RF power) from a transmitter terminal (e.g. terminal 11, FIG. 1), as controlled by an EIRP attenuator control unit (e.g. unit 17, FIG. 1). For an ideal response to a fade condition, the link quality monitor unit 15 (FIG. 1) supplies an EIRP attenuator command over order wire 16 causing the EIRP output to increase along relatively gradual sloped curve 61, as the rain attenuator 14 enters into the path of the link 22, and then to gradually decrease along curve 62 from a maximum EIRP setting at point 63, as the rain attenuator 14 passes out of the path of the link 22. However, as mentioned previously, the response is not always ideal, particularly because of the presence of intermodulation products.

Namely, as shown in FIG. 6, where the ALPC attenuator continues to cause an increase in the EIRP output of transmitter terminal 11 along curve 64, the EIRP value eventually reaches a level 65, corresponding to the avalanche point 54 in FIG. 5, beyond which point EIRP is rapidly driven along a relatively steep-sloped region 71 to a maximum EIRP level 72 corresponding to TWT saturation.

In the EIRP characteristic shown in FIG. 6, corrections for uplink and downlink fades along regions 61 and 62, respectively, typically occur at a rate of 0.1 dB/sec. On the other hand, in the avalanche region 71, the rate of change of EIRP is on the order of 1 dB/sec. or an order of magnitude greater than that of region 61. As a result, it is possible to tentatively detect the onset of a lockup condition by monitoring the rate of change of EIRP and detecting avalanche when dEIRP/dt exceeds a prescribed threshold (corresponding to the value of dEIRP/dt in region 71). Before this can be successfully accomplished, however, there is an additional source of channel interference which must be taken into account—specifically, scintillation effects.

More particularly, superimposed on curve 61 in FIG. 6 is a broken line curve 81 corresponding to a scintillation wave (as caused by solar interference (sun spots)) which effectively rides on the EIRP level produced by the ALPC attenuator. As shown in larger detail in the upper lefthand portion of FIG. 6, denoted by circle 85, the scintillation wave repeatedly undergoes a polarity reversal about line 61. Namely, the characteristics of the scintillation wave 81 are such that, when present, they typically undergo a peak-to-peak change (e.g. positive peak 83 to negative peak 84) of 6 dB and are cyclic over a time span of 5 seconds or less. Thus, the rate of change of the scintillation wave 81, dsc/dt, can approximate that of avalanche region 71 of the EIRP characteristic (1 dB/sec.). Because of the fact there is a polarity reversal in the scintillation wave, however, it is possible to distinguish between scintillation wave 81 and avalanche region 71 in the EIRP output. This is achieved in accordance with the present invention by requiring that the rate of change of EIRP (dEIRP/dt) which exceeds a prescribed threshold, and thereby tentatively corresponds to region 71, does so continuously over a minimum time span without a polarity reversal, thereby excluding scintillations as sources of an avalanche identification. In addition, uplink fades, which do not affect satellite TWT performance, are effectively filtered out by monitoring the satellite beacon at the transmitter terminal. For a better understanding of these signal processing steps (e.g. scintillation wave filtering and uplink fade exclusion) attention is directed to FIGS. 7 and 8 which respectively illustrate, diagrammatically, the configuration of an ALPC uplink terminal having an avalanche detector mechanism, and the details of the avalanche detection mechanism itself.

Figure 7:
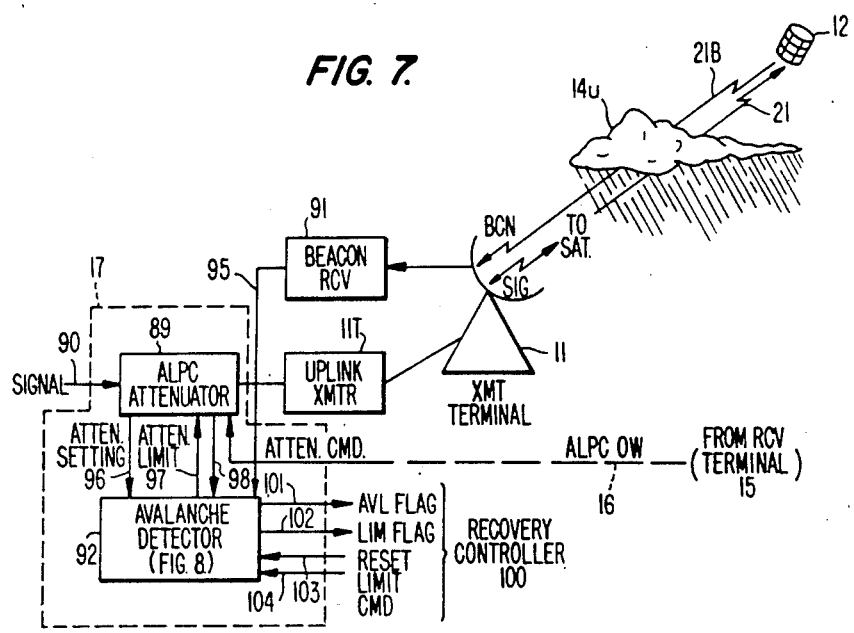
FIG. 7 is a block diagram of an ALPC avalanche detection and recovery mechanism.

Referring now to FIG. 7, there is shown a diagrammatic illustration of the components of an uplink earth station, such as terminal 11 and associated attenuator control unit 17 diagrammatically illustrated in FIG. 1, referenced above. In FIG. 7, terminal 11 is illustrated as transmitting a signal over an uplink channel 21 to satellite 12, the path of which channel may be impacted by an uplink rain fade 14U. The satellite transponder produces a tracking beacon 21B which, for the uplink channel between terminal 11 and the satellite 12, is shown in FIG. 7 as beacon 21B, which is received by terminal 11 and processed through a beacon receiver 91. The output of the beacon receiver 91 is coupled over link 95 to an avalanche detector 92 (the details of which will be described with reference to FIG. 8 below).

Input signals to be transmitted by terminal 11 are coupled over link 90 to EIRP attenuator control unit 17, which contains the avalanche detector 92. The amplitude of the input signal 90 is adjusted by an ALPC attenuator 89 contained within attenuator control unit 17 and coupled to uplink transmitter 11T for transmission by transmit terminal 11. The degree of attenuation impart by attenuator 89 is controlled by an attenuation limit signal supplied over order wire 16 from quality monitor unit 15. An upper limit is placed on the attenuator setting by line 97 from avalanche detector 92 and the actual setting of the attenuator 89 is indicated over link 96 which is coupled to avalanche detector 92. In normal operation (exclusive of a rain fade stress condition), the attenuator setting of ALPC attenuator has a prescribed upper limit. This upper limit value is coupled over line 98.

Avalanche detector 92 also contains additional signal coupling lines 101–104 which are coupled to a recovery controller 100 (the details of which will be described below with reference to FIG. 9). Link 101 supplies a signal indicating that an apparent avalanche condition has been detected by avalanche detector 92. Line 102 supplies an indication to recovery controller 100 that attenuator setting as represented by a signal supplied over links 96 is near the limit established by link 97. Link 103 is employed to reset the avalanche detector, while link 104 is employed to control the recovery of the channels from an initial minimum attenuator setting to an in service setting once the fade has passed.

Figure 8:
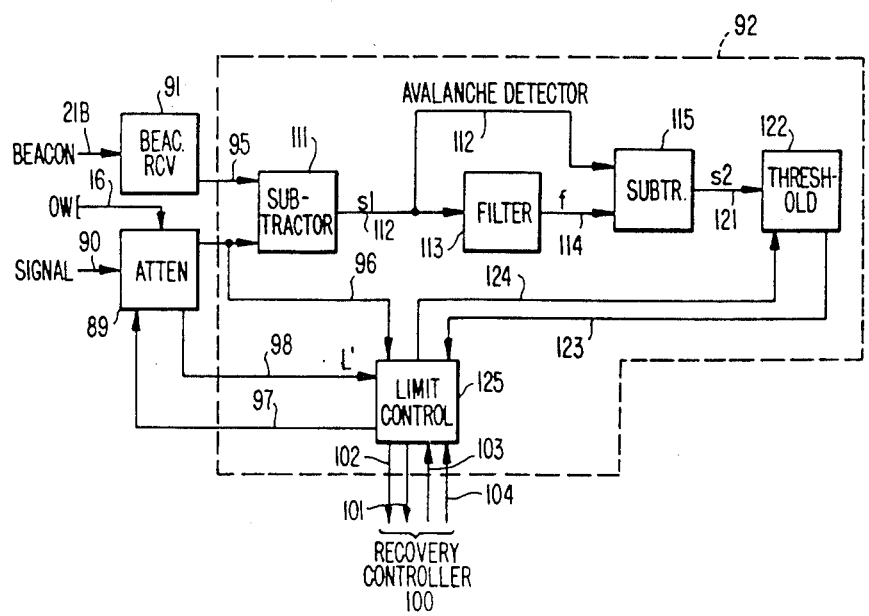
FIG. 8 is a functional block diagram of an avalanche detection mechanism.

Referring now to FIG. 8, there is shown in functional block diagram of avalanche detector 92. Although the functions shown in FIG. 8 may be implemented in hardware, a preferred embodiment of the avalanche detector comprises a suitably programmed processor with attendant memory, which implements the functions of the respective components of the avalanche detection mechanism 92 illustrated in FIG. 8. Accordingly in the description to follow, it will be assumed that the various signal levels from the beacon receiver and the ALPC attenuator have been quantized and digitized for processing in digital format by the avalanche detector 92 and its associated recovery controller 100 to be described below.

As pointed out above, an initial requirement of the avalanche detection mechanism is to exclude uplink fades, which do not contribute to avalanche, from the detection process. More particularly, when an uplink fade occurs, such as due to the presence of uplink rain 14U between transmit terminal 11 and satellite transponder 12 (FIG. 7), the power transmitted by terminal 11 is attenuated by the rain and a reduced power signal is received by the satellite 12. This reduced power signal is detected at the receive downlink terminal and an instruction is forwarded over the EIRP command orderwire link 16 to increase the power from uplink terminal 11. The increase in power from the uplink terminal 11 over channel 21 will simply bring the power back up to the level as originally received by the satellite 12, so that the original operating point of the TWT along curve 41 of FIG. 5 is not effectively increased due to the presence of an uplink fade. However, because the setting of ALPC attenuator is affected by the uplink fade, namely the setting was increased to control transmitted power, the attenuator setting of ALPC attenuator 89 must be referenced to the exclusion of the uplink fade. For this purpose, beacon signal 21B from satellite 12 is monitored in beacon receiver 91 and supplied as one input to a subtractor 111. The second input comes from the attenuator setting from attenuator 89 over link 96. Subtractor 111 produces an output $S1 = a$ (ALPC attenuator setting) $- b$ (beacon signal) to produce an output over link 112 representative of the actual setting of the ALPC attenuator with the effect of uplink fades removed. For the ERIP versus time characteristics shown in FIG. 6, discussed above, the values supplied over link 112 will correspond to some portion of curve 61 (including scintillation wave 81) as a downlink fade begins to pass through the path of the downlink channel.

As pointed out above, the mechanism for detecting an avalanche condition, as contrasted with an acceptable downlink fade which will not cause avalanche, is the significant difference in the slope of region 71 versus that of region 61, shown in FIG. 6. To establish a base line from which slope may be established, a successive number of samples (for example ten samples) of the ALPC attenuator setting (absent uplink fade corrections) supplied over link 112 are averaged by averaging filter 113, and the average is supplied over link 114 to a subtractor 115. The individual samples of the attenuator setting are supplied over link 112 to a second input of subtractor 115. Subtractor 115 subtracts the average value from the present sample value and supplies that output over link 121 to a threshold detector 122. Threshold detector 122 compares the output on link 121 with a reference value corresponding to +1 dB per second change. Namely, the reference threshold compared by threshold detector 122 is the 1 dB/sec. slope of avalanche region 71 shown in FIG. 6. If the output of subtractor 115 is equal to or greater than this rate of change of slope, threshold detector 122 produces an output over link 123 indicating the existence of a potential avalanche condition. To determine whether an actual avalanche condition exists or whether what has been detected corresponds to a scintillation condition (which also produces the 1 dB/sec. slope, as explained above with reference to FIG. 6), the threshold output from threshold detector 122 on link 123 is compared in a limit control unit 125 with the actual attenuator setting (respective of EIRP value), supplied over link 96 from ALPC attenuator 89. In response to the signal on link 123, limit controller 125 stores the normal limit of the attenuator supplied over link 98 and sets a new limit L in the attenuator 89 such that the limit is equal to the value of the attenuator link 96. Limit controller then examines a prescribed number of successive samples of the attenuator output over link 96 (for example, ten samples). With each sample, limit controller 125 subtracts the value of successive samples from each other. If the difference between successive accumulator values goes negative by an amount equal to or greater than 1 dB, namely representative of a polarity reversal as shown in the circled portion 85 of FIG. 6, limit controller 125 identifies the potential avalanche condition as supplied over link 123 as that being caused by scintillation, not a true avalanche condition. In this circumstance, the previously set original value of the accumulator supplied over link 98 is restored over link 97 as the normal attenuator upper limit and a reset signal is supplied over link 124 to threshold circuit 122 to reset the state of line 123, indicating that scintillation, rather than true avalanche has been detected.

If, on the other hand, for the prescribed number of successive samples there has been no polarity reversal detected, then it is assumed that the potential avalanche condition signal supplied over link 123 corresponds to a true avalanche condition, namely the successive slope values dEIRP/dt that have been detected all fall along region 71 of FIG. 6. In this circumstance, limit controller 125 declares an avalanche condition by supplying a signal over link 101 to the recovery controller 100. Recovery controller 100, to be described below with reference to FIG. 9, then takes action to limit the setting of the ALPC attenuator to a minimum value and thereafter carry out the recovery procedure, described briefly above, through which fade participant channels are selectively excluded from the satellite communication network until the downlink fade condition has receded.

Namely, in response to a "declare-avalanche" flag on link 101, recovery controller 100 transmits a recovery limit command signal over link 104 to the limit controller 125 instructing the limit controller to set the ALPC attenuator at its minimum setting, via a signal over link 97. This effectively shuts down the power from the signal being coupled to the uplink transmitter 11T and thereby prevents this particular terminal from driving the satellite TWT into saturation. Once the downlink fade which has caused the potential avalanche condition has disappeared, the associated recovery controller will supply a reset signal over link 103 instructing the limit controller to remove the minimum limit setting of the ALPC attenuator and restore the link to its normal operation. This effectively restores the previous limit setting L' in the ALPC attenuator 89. In addition, limit controller 125 supplies a signal over link 124 to reset the threshold detector 122 thereby removing the avalanche detection signal on link 123, just as it had in the case of a scintillation polarity reversal.

An additional action taken by the limit control unit 125 is a comparison of the ALPC attenuator setting on link 96 with an upper threshold corresponding to maximum EIRP. For this purpose, limit controller compares the attenuator setting with the maximum EIRP limit, shown as region 72 in FIG. 6. When the level setting on link 96 falls within 2 dB of this setting, the limit controller supplies a signal over link 102 to the recovery controller indicating a potential saturation condition. As will be explained below, in response to this signal, the recovery controller takes immediate action to limit the ALPC attenuator to its minimum value via a signal over link 104, as described above.

Avalanche Onset Recovery Control

Figure 9:
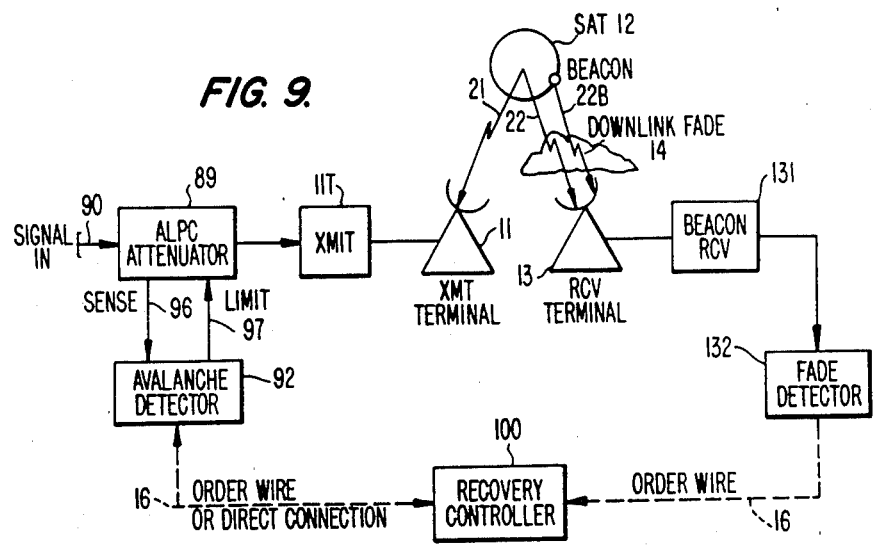
FIG. 9 is a block diagram of a satellite communications network incorporating an avalanche condition recovery mechanism.

Referring now to FIG. 9, a schematic block diagram illustration of the satellite communication network having a recovery controller 100 coupled in the orderwire link 16 between the quality monitor unit 15 for the downlink terminal and the avalanche detector 92 within the control attenuator 17 of the uplink terminal, is shown. As is the case with the avalanche detector 92, recovery controller 100 is preferably a digital processing unit, comprising a suitably programmed microprocessor and attendant memory, for processing the signal supplied over links 101 and 102 from each link associated with the satellite transponder channel in which a fade has been detected. Recovery controller 100 executes an algorithm, to be described below, through which verification of the occurrence of avalanche for the satellite channel of interest may be carried out and in response to which minimum attenuator settings for the ALPC attenuators 89 are then rapidly effected and maintained until the fade disappears.

One of the useful criterion for establishing whether or not an avalanche conditions has occurred is the gain-to-system noise temperature (G/T) of the terminal antenna of interest. Namely, the G/T ratio of each terminal antenna is taken into account, so that an accurate correlation of the impact of each terminal whose channel is subject to the fade condition may be processed. In effect, recovery controller 100 correlates the avalanche detection signals for each of the ALPC links in the satellite channel and determines that an avalanche condition, in response to which corrective action must be taken, has occurred depending upon a number of factors, including the gain to thermal noise ratio of each link, as described above. For each link i, its associated avalanche detector 92 supplies an avalanche flag over output link 101 from the limit control unit 125. The limit controller 125 also supplies a signal over link 102 indicating whether or not the ALPC attenuator is within 2 dB of its maximum EIRP limit, identified by region 72 in the illustration of FIG. 6, referenced above.

In accordance with the avalanche verification processing algorithm carried out by the recovery controller 100, each of these factors is weighted and averaged over the number of links in the channel, to produce a probability indication that an avalanche condition which will drive the satellite TWT into saturation has occurred for a number of links which will effectively impact the majority of links in the channel. Specifically, the processing algorithm executed by recovery controller defines a control function C in accordance with the expression:

$$C = D \left( \sum_{i=1}^{n} \right) (G/T)i/(G/T)s \times Fi \times Li \left( \sum_{i=1}^{n} Li \right)$$

where:

n is the number of ALPC links in the satellite channel;

Fi is the avalanche flag produced over link 101 from avalanche detector 92 and is equal to 1 if an avalanche condition has been detected but a 0 if no avalanche condition has been detected;

D is equal to 1 when the first avalanche flag is reported and remains reported for a prescribed period of time (e.g. 10 seconds) but is 0 at all other times:

Li equals 0 if the ALPC attenuator 89 is within 2 dB of its normal limit when D=1, as indicated over link 102, but is equal to 1 otherwise;

$(G/T)i$ is the $G/T$ of link i; and $(G/T)s$ is equal to $\sum_{i=1}^{n} (G/T)i \times Li$ If, at any time during the 10 second window wherein an avalanche flag has been reported D=1, the recovery controller verifies the existence of avalanche and supplies a signal over link 104 to limit the amplitude setting of the ALPC attenuator 89 to its minimum limit, thereby effectively providing no signal through the transmitter over the satellite channel. If the verification criterion is not at least equal to 50% then the recovery controller 100 supplies a signal over link 103 to reset each of the avalanche detectors 92 for each of the links i.

By the above process, the recovery controller effectively correlates the avalanche detection flags from all of the links i in the satellite transponder channel to verify that avalanche has indeed occurred. By effectively weighting the average of the avalanche detection flags Fi by requiring that the weighted average be at least equal to 50%, what is effectively accomplished is a majority criterion detection scheme. Because the weighted average is a function of the receiver terminal G/T and whether or not the link is near its power limit when avalanche occurs, a better picture of a true avalanche can be determined. For example, high G/T links, the ALPC settings for which are far from their upper power limits, provide a more accurate avalanche detection output. Thus, a weighted average is better than a pure average in detecting avalanche.

By limiting the ALPC attenuator for each link in the channel, it is effectively guaranteed that there is no power being supplied through the satellite TWT, so that the potential saturation condition cannot occur. Thereafter, those links for which an avalanche flag has been not been detected or whose downlink beacon levels indicates that they are not involved in a downlink fade are restored to their normal ALPC settings prior to the detection of the avalanche condition. In this way, only those links which have participated in the downlink fade which brought on the avalanche condition are selectively excluded from using the satellite transponder until the fade disappears.

In order to determine whether a link is involved in a downlink fade and to determine when the fade disappears, a beacon transmitted from satellite 12 over beacon downlink channel 22B is monitored at the receiver terminal 13, as shown in FIG. 9. Namely, at receiver terminal 13 there is a beacon receiver 131 and associated downlink fade detector 132 which monitors the level of the beacon from the satellite 12. When the beacon level drops below a prescribed threshold, it is assumed that the reason for the drop is downlink attenuation, such as rain fade 14. This indication as supplied by fade detector 132 is used by recovery controller 100 to maintain the limits on the ALPC attenuators for only those links for which an avalanche condition has been reported and whose beacon receivers 131 and fade detectors 132 do not indicate the presence of a downlink fade. As the fade passes and the beacon level returns to its normal value, an output is supplied from downlink fade detector 132 to recovery controller 100 to indicate that the fade has receded and the minimum power limit imposed on the ALPC attenuator for the link of interest may be removed. Upon this occurrence, recovery controller 100 supplies a signal over link 103 to a limit controller 125 within the avalanche detector 92. In response to this signal, limit controller 100 resets the ALPC attenuator setting to the value supplied over link 98, prior to detection of avalanche via link 97.

LOCKUP RECOVERY

As pointed out above, in accordance with a second aspect of the invention, irrespective of the ability of the avalanche detection/lockup avoidance scheme described above to detect the onset of lockup caused by downlink fades and for recovery from such an avalanche condition, the present invention provides a scheme for recovering from an actual lockup condition that has been caused by downlink fades in the presence of adaptive link power control. This lockup detection and recovery technique does not rely upon the orderwire link 16 between the link quality monitor unit 15 at the receive link and the EIRP attenuator unit at the transmit link during lockup, since all links may exhibit poor performance during the lockup condition, including the orderwires.

Figure 10:
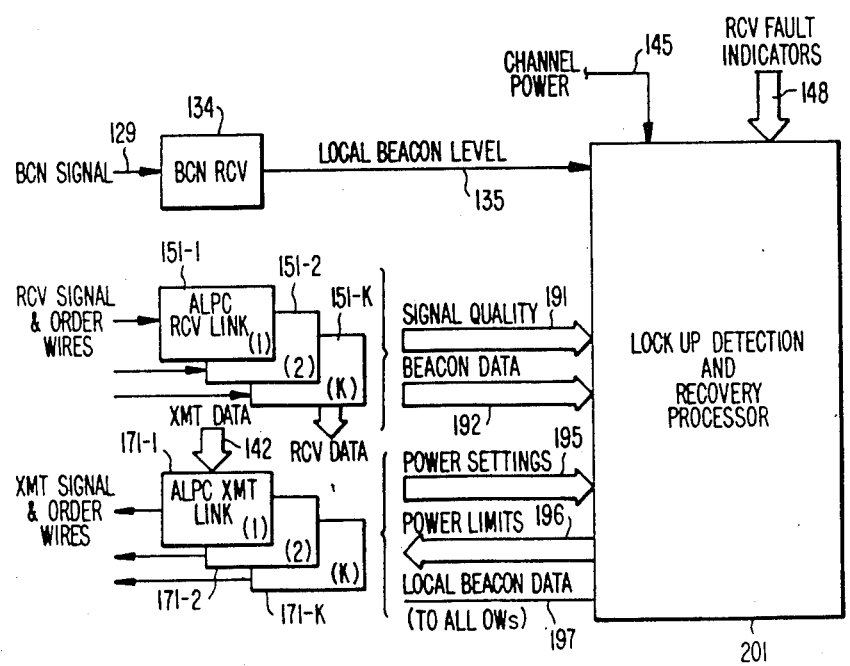
FIG. 10 is a diagrammatic illustration of an ALPC lockup detection and recovery mechanism.

Referring now to FIG. 10 there is shown a block diagram of the signal coupling and processing components of the lockup detection and recovery scheme. As is the case with the avalanche detector and recovery controller described above, the lockup detection and recovery mechanism of the present invention, shown in FIG. 10 as unit 201, is preferably comprised of a suitably programmed processor having attendant memory for storing a control program for implementing the detection and recovery signal processing sequence to be described below. Rather than describe the program, per se, the description to follow will discuss the signal processing sequence, from which an appropriate program depending upon the particular processor and program language employed may be derived.

Coupled to the lockup detection and recovery processor 201 are signal inputs from ALPC transmit terminal links 171-1 . . . 171-k and ALPC receiver terminal links 151-1 . . . 151-k. From the receiver links, data representative of signal quality is coupled over link 191, and beacon data indicating the level of the beacon signal from the satellite transponder to the receive terminal over link 22B is coupled to processor 201.

From the transmit links 151-1 . . . 151-k, the ALPC attenuator settings and power limits, such as those corresponding to the settings on links 96 and 97 in the avalanche detector of FIG. 8 are supplied over links 195 and 196, respectively. Link 197 supplies an indication of the local beacon data that has been received by a local beacon receiver 134 and coupled to the processor over link 135. Additionally supplied to the lockup detection and recovery processor 201 are data signals from fault indicators that may be contained in terminal receivers, via link 148 indicating a misoperation of the receiver equipment, for supplying an indication of the health of the receiver equipment and thereby an accuracy of output signals from the receiver terminals with respect to fade indications. Finally, link 145 provides data representative of the channel power from the satellite.

In accordance with the lockup detection and recovery scheme shown in FIG. 10, processor 201 identifies the occurrence of a lockup condition by monitoring the signal quality of all receiver links at a terminal under ALPC control, as supplied over link 191 and the ALPC attenuator settings from the transmit links supplied over link 195. If all receive links from a particular satellite transponder channel simultaneously exhibit poor steady state signal quality, as indicated by the data supplied over link 191, and if the receive terminal fault indicator data supplied over link 148 is not otherwise indicate faulty equipment, and, if the ALPC attenuator setting data supplied over link 195 for all of the transmit link attenuators in the channel are at their maximum level, processor 201 declares that particular channel to be in a lockup condition. Processor 201 then takes steps to reduce the power supplied by each of the transmit terminals so as to effectively terminate the lockup condition and then selectively turns on respective transmitter links which have been identified as not participating in a downlink fade which caused the lockup condition. When the downlink fade recedes, the ALPC attenuator limit settings on the transmit links, which have remained low because of their participation in a fade, are remved and the network is restored to its prior operation.

The specific procedure through which processor 201 monitors the terminal signal levels and processes the data supplied therefrom is shown in the flow chart of FIG. 11, to which reference will be made in the description below.

As pointed out previously, the occurrence of a fade condition, namely a reduction in signal power from the satellite transponder to the ground terminal is readily detected by monitoring the satellite beacon data and comparing the received data with a threshold. For this purpose, in step 221 each receive link supplies its own beacon data over link 192 to processor 201. This data is stored as a downlink fade depth representation in dB. In step 222, the outputs of the respective link quality monitor units 15-1 . . . 15-k of the downlink terminals are supplied over link 191 and a comparison is made of whether or not the quality of the link Eb/No is less than the required signal-to-noise ratio $Eb/No_{Req}$ from the uplink transmitter. Through the use of a prescribed majority ratio, such as 80%, the beacon data and signal quality data from each link are correlated with one another in step 223. This step effectively rules out the possibility of a lockup condition where only a single link, or perhaps two links are suffering an apparent fade condition, whereas a large number of the remaining links in the channel are operating satisfactorily.

At the same time, in step 224 processor 201 examines the ALPC power settings by examining the data supplied over link 195 from the respective transmit links of the channel. Again, a prescribed majority decision correlation is carried out to exclude the possibility of a lockup condition being identified where only a single channel has reached it maximum power setting. It should be noted that the maximum power setting for any ALPC attenuator is not the same as all other attenuators. Each is individually tailored for the needs of that terminal and the link, and lockup is not to be identified simply because the ALPC attenuator for a single link (which may be considerably lower than the attenuator of other links) is at its maximum set limit.

In addition to checking the signal quality of the receive terminals, their respective beacon indication and the power settings of the transmits, processor 201 examines the respective fault indicators for each of the receive terminals in step 225. If the fault indicators do not indicate anomalies in the operation of the equipment, the algorithm may then rely on the accuracy of the signal quality and beacon data readings on links 191 and 192 from the receiver terminals.

Where satellite power level data is available over link 145, it is correlated for each of the links in the channel in step 226, again through a prescribed majority decision process.

If each of the above conditions is satisfied, namely the signal quality for substantially all of the received terminals is poor (step 222), if there are no faults indicated in the receive terminal equipment (step 225), if the beacon data indicates a substantial network-wide downlink fade in the satellite channel (steps 221–223) and if the power settings for substantially all of the ALPC attenuators in the transmit terminals have reached their maximum limit (step 224), processor 201 identifies the condition as being a lockup condition (step 227) and instructs each of the transmit terminals, via link 196, to control the ALPC attenuators to a minimum settable level, namely to effectively null-out the transmitted signals so that the lockup condition is removed (step 228). When this occurs, again with reference to FIG. 5, the operating point of the satellite transponder moves from the saturation level 45 to a point on curve 41 close to the origin.

After a prescribed time delay, with the channel power data supplied over link 145 having indicated that the operating point has dropped substantially down on the operating curve 41, those links which were identified as not being involved in a significant downlink fade, namely whose beacon data supplied over link 192 indicates the absence of a fade, are instructed via power limit link 196, to remove the minimum limits on the ALPC attenuators, so that those links may begin sending data over the uplink and downlink channels 21 and 22, respectively (step 229). During this time, the beacon data which is received from beacon receiver 131 is also coupled over link 197 via a local orderwire to each of the transmit terminals.

Finally, in step 230, at each receive terminal the beacon signal from the satellite is monitored. When the beacon data indicates that the fade for that particular link has disappeared, the processor removes the attenuator setting limit previously imparted to the ALPC attenuator, so as to permit the powered-down link to resume normal operation. By continuously sensing beacon data representing local fade conditions and transmitting this local beacon data to each remote terminal through each ALPC transmit orderwire, the recovery procedure subsequent to lockup detection may be effected.

Also, downlink fade conditions from the remote terminals are retrieved at the local terminal through each ALPC receive link orderwire. Thus, even though the orderwire may be inoperative during the lockup condition, the parameters of the links at the remote end of the link immediately prior to lockup have been stored so that lockup identification and corrective action (recovery) may proceed.

As will be appreciated from the foregoing description, the present invention provides a mechanism for detecting and avoiding a satellite transponder TWT saturation condition in an ALPC communication network. By detecting the onset of a lockup condition through the avalanche detection mechanism, the attenuator (the power) settings of each of the ALPC attenuators may be clamped at a level which prevents the network from going into saturation. Namely, those links which have been identified as participating in a downlink fade have their ALPC attenuator settings placed at a minimum level, so that the operating point of the transponder TWT may be reduced below the avalanche threshold. Thereafter, as the fade recedes, those units whose ALPC attenuators have minimum power settings may be restored to normal operation. Because the orderwire which couples link quality data from a received terminal monitor unit to transmitter attenuator control units through the avalanche detection and recovery scheme, described above, may itself be impacted by a downlink fade, the foregoing scheme is augmented by a lockup detection and avoidance mechanism through which recovery from an actual lockup may take place. Pursuant to this scheme, transmit and receive terminal data is monitored and prescribed signal quality and ALPC attenuator setting data are correlated with one another. By correlating all of the links in the channel, a lockup detection is not indicated where only a single link may "blow-up". When a lockup condition has been detected, all of the links are effectively turned off to permit the TWT to recover from its saturation condition. Thereafter, those links which have not been identified as being in the path of a downlink fade are restored to normal service. When the fade recedes, those links which have had their power settings minimized for the presence of the fade are restored.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. For use in an adaptive link power control (ALPC) satellite communications network wherein signals conveyed over a communications channel between transmitting and receiving terminals are amplified and relayed by a satellite amplifier device the power availability of which is controlled to meet the demands of the links of the channel, a method of preventing said satellite amplifier device from being driven to a signal amplification degradation state by adaptive link power control, in response to the attenuation of a signal relayed by said satellite amplifier device between said transmitting and receiving terminals, comprising the steps of:
    (a) monitoring a signal representative of the signal amplification state of said satellite amplifier device; and
    (b) in response to the signal monitored in step (a) having a characteristic indicative of the onset of aaid signal amplification degradation state, selectively adjusting a prescribed characteristic of signals conveyed from said transmitting links to said satellite amplifier device.

2. A method according to claim 1, wherein step (a) comprises monitoring a signal representative of the effective irradiated power contained in the signals conveyed from said transmitting terminals to said satellite amplifier device.

3. A method according to claim 2, wherein step (b) comprises the step of selectively limiting the effective irradiated power contained in signals conveyed from said transmitting terminals to said satellite amplifier device.

4. A method according to claim 3, wherein step (b) comprises the step of selectively limiting the effective irradiated power contained in signals conveyed from said transmitting terminals to said satellite amplifier device in response to a prescribed rate of change of said effective irradiated power.

5. A method according to claim 4, wherein said prescribed rate of change of said effective irradiated power corresponds to the rate of change of said effective irradiated power reaching a predetermined threshold.

6. A method according to claim 4, wherein said prescribed rate of change of said effective irradiated power corresponds to the rate of change of said effective irradiated power exceeding attaining a predetermined threshold for a predefined period of time.

7. A method according to claim 1, wherein signals to be conveyed from a transmitter terminal to said satellite amplifier device are coupled through an ALPC attenuator associated with said terminal for controllably adjusting the effective irradiated power contained in signals conveyed therefrom to said satellite amplifier device, and wherein step (a) comprises, for a respective communication link, monitoring the attenuation setting of said ALPC attenuator.

8. A method according to claim 7, wherein step (b) comprises the step of selectively limiting the attenuation settings of the ALPC attenuators associated with the transmitter terminals of said network, thereby selectively limiting the effective irradiated power contained in the signals conveyed from said transmitting terminals to said satellite amplifier device.

9. A method according to claim 7, wherein a prescribed beacon signal is transmitted from said satellite to said transmitting terminals, and wherein step (a) includes the step of comparing the level of the beacon signal received at a transmitting terminal with the level of a signal to be conveyed to said satellite amplifier device, that has been controllably adjusted by the ALPC attenuator thereat, and providing therefrom a signal representative of the effective irradiated power conveyed in signals conveyed from said transmitting terminal to said satellite amplifier device.

10. A method according to claim 1, wherein step (b) comprises the step of selectively limiting the effective irradiated power contained in signals conveyed from said transmitting terminals to said satellite amplifier device.

11. A method according to claim 10, further including the step (c) of selectively removing the selective limiting of the effective irradiated power contained in signals conveyed from said transmitting terminals to said satellite amplifier device.

12. A method according to claim 11, wherein a prescribed beacon signal is transmitted from said satellite to said receiving terminals, and where step (c) comprises selectively removing the selective limiting of the effective irradiated power contained in signals conveyed from said transmitting terminals to said satellite amplifier device in response to the level of said prescribed beacon signal as received at a receiving terminal being above a preselected threshold.

13. A method according to claim 10, wherein a prescribed beacon signal is transmitted from said satellite to said receiving terminals, and wherein step (b) comprises selectively limiting the effective radiated power contained in signals conveyed from said transmitting terminals to said satellite amplifier device in response to the level of said prescribed beacon signal as received at a receiving terminal being less than a predetermined threshold.

14. A method according to claim 13, wherein signals to be conveyed from a transmitter terminal to said satellite amplifier device are coupled through an ALPC attenuator associated with said transmitter terminal for controllably adjusting the effective irradiated power contained in signals conveyed therefrom to said satellite amplifier device, and wherein step (b) comprises selectively limiting the attenuator settings of the ALPC attenuators associated with the transmitter terminals of the network, thereby selectively limiting the effective irradiated power contained in the signals conveyed from said transmitting terminals to said satellite amplifier device.

15. A method according to claim 3, wherein said signal amplification degradation state corresponds to the avalanche of the power output/input characteristic of said satellite amplifier device to saturation.

16. A method according to claim 7, wherein
step (a) comprises
for each link in said communications channel, generating a signal Fi representative of whether or not the monitored signal for said each link i has a characteristic indicative of the onset of said signal amplification degradation state; and wherein
step (b) comprises
generating a signal D representative of whether or not the first of the signals Fi generated in step (a) has a prescribed valued for a predetermined period of time, generating a signal Li representative of whether or not the ALPC attenuator for link i has a prescribed attenuation setting when said signal D is representative that the first of the signals Fi has said prescribed value for said predetermined period of time,
generating a signal C defined by the expression $$C = D\left(\sum_{i=1}^{n} ((G/T)i/(G/T)s) \times Fi \times Li / \sum_{i=1}^{n} Li\right),$$

wherein
(G/T)i is the ratio of transmitter terminal gain to transmitter terminal system noise temperature of link i, $$(G/T)s = \sum_{i=1}^{n} (G/T)i \times Li, \text{ and}$$

n is the number of links of the communications channel, and
selectively adjusting the attenuation settings of said ALPC attenuators in response to signal C having a predetermined value when said signal D is representative that the first of the signals Fi has said prescribed value for said predetermined period of time.

17. For use in an adaptive link power control (ALPC) satellite communications network wherein signals conveyed over a communications channel between transmitting and receiving terminals are amplified by a satellite amplifier device the power availability of which is controlled to meet the demands of the links of the channel, a method of detecting the occurrence of said satellite amplifier device being driven into a signal amplification degradation state by adaptive link power control in response to the attenuation of a signal relayed by said satellite amplifier device between said transmitting and receiving terminals, and causing said satellite amplifier device to recover from said signal amplification degradation state comprising the steps of:
(a) monitoring the quality of signals received at said receiving terminals;
(b) monitoring signals representative of the effective irradiated power contained in signals transmitted by said transmitting terminals; and
(c) adjusting the effective irradiated power contained in signals transmitted by selected ones of transmitting terminals associated with links for which the quality of signals monitored in step (a) is less than a prescribed quality and for which the effective irradiated power contained in signals monitored in step (b) is above a prescribed level.

18. A method according to claim 17, wherein step (c) comprises:
(c-1) reducing the effective irradiated power contained in signals transmitted by transmitting terminals associated with all the links of said channel, and
(c-2) increasing the effective irradiated power contained in signals transmitted by those transmitting terminals associated with links other than those links for which the quality of signals monitored in step (a) is less than a prescribed quality and for which the effective irradiated power contained in signals monitored in step (b) is above a prescribed level.

19. A method according to claim 18, wherein step (c) further includes the step of
(c-3) selectively increasing the effective irradiated power contained in signals transmitted by those transmitting terminals associated with links for which the quality of signals monitored in step (a) is less than a prescribed quality for which the effective irradiated power contained in signals monitored in step (b) is above a prescribed level.

20. A method according to claim 17, wherein said prescribed quality corresponds a prescribed bit rate bandwidth.

21. A method according to claim 17, wherein signals to be conveyed from a transmitter terminal to said satellite amplifier device are coupled through an ALPC attenuator associated with said terminal for controllably adjusting the effective irradiated power contained in signals conveyed therefrom to said satellite amplifier device, and wherein step (b) comprises, for a respective link, monitoring the attenuation setting of the ALPC attenuator.

22. A method according to claim 17, wherein a prescribed beacon signal is transmitted from said satellite to said receiving terminals, and wherein step (c) comprises
(c-1) reducing the effective irradiated power contained in signals transmitted by transmitting terminals associated with all the links of said channel, and
(c-2) increasing the effective irradiated power contained in signals transmitted by those transmitting terminals associated with links at receiving terminals for which the level of said prescribed beacon signal as received thereby is equal or above a preselected threshold.

23. A method according to claim 22, wherein step (c) further includes the step of
(c-3) selectively increasing the effective irradiated power contained in signals transmitted by those transmitting terminals associated with links at receiving terminals for which the level of said prescribed beacon signal as received thereby is less that a prescribed threshold.

24. A method according to claim 21, wherein step (c) comprises reducing the attenuation settings of the ALPC attenuators of selected ones of said transmitting terminals for which the quality of signals monitored in step (a) is less than a prescribed quality and for which the attenuation settings monitored in step (b) are above a prescribed setting.

25. For use in an adaptive link power control (ALPC) satellite communications network wherein signals conveyed over a communications channel between transmitting and receiving terminals are amplified by a satellite amplifier device the power availability of which is controlled to meet the demands of the links of the channel, a method controlling the amplification of signals relayed by said satellite amplifier device in the presence of signal amplification degradation causing conditions in links of said channel comprising the steps of:
(a) monitoring a signal representative of the signal amplification state of said satellite amplifier device;
(b) in response to the signal monitored in step (a) having a characteristic indicative of the onset of a signal amplification degradation state of said satellite amplifier device, selectively adjusting a prescribed characteristic of signals conveyed from said transmitting links to said satellite amplifier device;
(c) monitoring the quality of signals received at said receiving terminals; and
(d) in response to the quality of signals monitored in step (c) being less than a prescribed quality and in response to the signal monitored in step (a) being representative that the level of the signal amplification state of said satellite amplifier device is above a prescribed level, adjusting the effective irradiated power contained in signals transmitted by selected ones of said transmitting terminals.

26. A method according to claim 25, wherein step (a) comprises monitoring a signal representative of the effective irradiated power contained in the signals conveyed from said transmitting terminals to said satellite amplifier device.

27. A method according to claim 26, wherein step (b) comprises the step of selectively limiting the effective irradiated power contained in signals conveyed from said transmitting terminals to said satellite amplifier device.

28. A method according to claim 27, wherein step (b) comprises the step of selectively limiting the effective irradiated power contained in signals conveyed from said transmitting terminals to said satellite amplifier device in response to a prescribed rate of change of said effective irradiated power.

29. A method according to claim 28, wherein said prescribed rate of change of said effective irradiated power corresponds to the rate of change of said effective irradiated power exceeding attaining a predetermined threshold for a predefined period of time.

30. A method according to claim 25, wherein signals to be conveyed from a transmitter terminal to said satellite amplifier device are coupled through an ALPC attenuator associated with said terminal for controllably adjusting the effective irradiated power contained in signals conveyed therefrom to said satellite amplifier device, and wherein step (a) comprises, for a respective communication link, monitoring the attenuation setting of said ALPC attenuator.

31. A method according to claim 30, wherein step (b) comprises the step of selectively limiting the attenuation settings of the ALPC attenuators associated with the transmitter terminals of said network, thereby selectively limiting the effective irradiated power contained in the signals conveyed from said transmitting terminals to said satellite amplifier device.

32. A method according to claim 26, wherein step (d) comprises
(d-1) reducing the effective irradiated power contained in signals transmitted by transmitting terminals associated with all the links of said channel, and
(d-2) increasing the effective irradiated power contained in signals transmitted by those transmitting terminals associated with links other than those links for which the quality of signals monitored in step (c) is less than a prescribed quality and for which the effective irradiated power contained in signals monitored in step (a) is above a prescribed level.

33. A method according to claim 32, wherein step (d) further includes the step of
(d-3) selectively increasing the effective irradiated power contained in signals transmitted by those transmitting terminals associated with links for which the quality of signals monitored in step (c) is less than a prescribed quality for which the effective irradiated power contained in signals monitored in step (a) is above a prescribed level.

34. A method according to claim 26, wherein a prescribed beacon signal is transmitted from said satellite to said receiving terminals, and wherein step (c) comprises (d-1) reducing the effective irradiated power contained in signals transmitted by transmitting terminals associated with all the links of said channel, and (d-2) increasing the effective irradiated power contained in signals transmitted by those transmitting terminals associated with links at receiving terminals for which the level of said prescribed beacon signal as received thereby is equal or above a preselected threshold.

35. A method according to claim 34, wherein step (d) further includes the step of (d-3) selectively increasing the effective irradiated power contained in signals transmitted by those transmitting terminals associated with links at receiving terminals for which the level of said prescribed beacon signal as received thereby is less that a prescribed threshold.

36. For use in an adaptive link power control (ALPC) satellite communications network wherein signals conveyed over a communications channel between transmitting and receiving terminals are amplified and relayed by a satellite amplifier device the power availability of which is controlled to meet the demands of the links of the channel, a system for preventing said satellite amplifier device from being driven to a signal amplification degradation state by adaptive link power control in response to the attenuation of a signal relayed by said satellite amplifier device between said transmitting and receiving terminals, comprising:

first means for monitoring a signal representative of the signal amplification state of said satellite amplifier device; and second means, coupled to said first means and responsive to the signal monitored by said first means having a characteristic indicative of the onset of said signal amplification degradation state, for selectively adjusting a prescribed characteristic of signals conveyed from said transmitting links to said satellite amplifier device.

37. A system according to claim 36, wherein said first means comprises means for monitoring a signal representative of the effective irradiated power contained in the signals conveyed from said transmitting terminals to said satellite amplifier device.

38. A system according to claim 37, wherein said second means comprises means for selectively limiting the effective irradiated power contained in signals conveyed from said transmitting terminals to said satellite amplifier device.

39. A system according to claim 38, wherein said second means comprises means for selectively limiting the effective irradiated power contained in signals conveyed from said transmitting terminals to said satellite amplifier device in response to a prescribed rate of change of said effective irradiated power.

40. A system according to claim 39, wherein said prescribed rate of change of said effective irradiated power corresponds to the rate of change of said effective irradiated power reaching a predetermined threshold.

41. A system according to claim 40, wherein said prescribed rate of change of said effective irradiated power corresponds to the rate of change of said effective irradiated power exceeding attaining a predetermined threshold for a predefined period of time.

42. A system according to claim 36, wherein signals to be conveyed from a transmitter terminal to said satellite amplifier device are coupled through an ALPC attenuator associated with said terminal for controllably adjusting the effective irradiated power contained in signals conveyed therefrom to said satellite amplifier device, and wherein said first means comprises means for monitoring, for a respective communication link, the attenuation setting of said ALPC attenuator.

43. A system according to claim 42, wherein said second means comprises means for selectively limiting the attenuation settings of the ALPC attenuators associated with the transmitter terminals of said network, thereby selectively limiting the effective irradiated power contained in the signals conveyed from said transmitting terminals to said satellite amplifier device.

44. A system according to claim 42, wherein a prescribed beacon signal is transmitted from said satellite to said transmitting terminals, and wherein said first means includes means for comparing the level of the beacon signal received at a transmitting terminal with the level of a signal to be conveyed to said satellite amplifier device, that has been controllably adjusted by the ALPC attenuator thereat, and providing therefrom a signal representative of the effective irradiated power conveyed in signals conveyed from said transmitting terminal to said satellite amplifier device.

45. A system according to claim 36, wherein said second means comprises means for selectively limiting the effective irradiated power contained in signals conveyed from said transmitting terminals to said satellite amplifier device.

46. A system according to claim 45, further including third means for selectively removing the selective limiting of the effective irradiated power contained in signals conveyed from said transmitting terminals to said satellite amplifier device.

47. A system according to claim 46, wherein a prescribed beacon signal is transmitted from said satellite to said receiving terminals, and where said third means comprises means for selectively removing the selective limiting of the effective irradiated power contained in signals conveyed from said transmitting terminals to said satellite amplifier device in response to the level of said prescribed beacon signal as received at a receiving terminal being above a preselected threshold.

48. A system according to claim 45, wherein a prescribed beacon signal is transmitted from said satellite to said receiving terminals, and wherein said second means comprises means for selectively limiting the effective radiated power contained in signals conveyed from said transmitting terminals to said satellite amplifier device in response to the level of said prescribed beacon signal as received at a receiving terminal being less than a predetermined threshold.

49. A system according to claim 48, wherein signals to be conveyed from a transmitter terminal to said satellite amplifier device are coupled through an ALPC attenuator associated with said transmitter terminal for controllably adjusting the effective irradiated power contained in signals conveyed therefrom to said satellite amplifier device, and wherein said second means comprises means for selectively limiting the attenuator settings of the ALPC attenuators associated with the transmitter terminals of the network, thereby selectively limiting the effective irradiated power contained in the signals conveyed from said transmitting terminals to said satellite amplifier device.

50. A system according to claim 38, wherein said signal amplification degradation state corresponds to the avalanche of the power output/input characteristic of said satellite amplifier device to saturation.

51. For use in an adaptive link power control (ALPC) satellite communications network wherein signals conveyed over a communications channel between transmitting and receiving terminals are amplified by a satellite amplifier device the power availability of which is controlled to meet the demands of the links of the channel, a system for detecting the occurrence of said satellite amplifier device being driven into a signal amplification degradation state by adaptive link power control in response to the attenuation of a signal relayed by said satellite amplifier device between said transmitting and receiving terminals, and causing said satellite amplifier device to recover from said signal amplification degradatin state comprising:
   first means for monitoring the quality of signals received at said receiving terminals;
   second means for monitoring signals representative of the effective irradiated power contained in signals transmitted by said transmitting terminals; and
   third means, coupled to said first and second means, for adjusting the effective irradiated power contained in signals transmitted by selected ones of transmitting terminals associated with links for which the quality of signals monitored by said first means is less than a prescribed quality and for which the effective irradiated power contained in signals monitored by said second means is above a prescribed level.

52. A system according to claim 51, wherein said third means comprises
   means for reducing the effective irradiated power contained in signals transmitted by transmitting terminals associated with all the links of said channel and, thereafter, increasing the effective irradiated power contained in signals transmitted by those transmitting terminals associated with links other than those links for which the quality of signals monitored by said first means is less than a prescribed quality and for which the effective irradiated power contained in signals monitored by said second means is above a prescribed level.

53. A system according to claim 52, wherein said third means includes means for selectively increasing the effective irradiated power contained in signals transmitted by those transmitting terminals associated with links for which the quality of signals monitored by said first means is less than a prescribed quality for which the effective irradiated power contained in signals monitored said second means is above a prescribed level.

54. A system according to claim 51, wherein signals to be conveyed from a transmitter terminal to said satellite amplifier device are coupled through an ALPC attenuator associated with said terminal for controllably adjusting the effective irradiated power contained in signals conveyed therefrom to said satellite amplifier device, and wherein said second means comprises means for monitoring, for a respective link, the attenuation setting of the ALPC attenuator.

55. A system according to claim 51, wherein a prescribed beacon signal is transmitted from said satellite to said receiving terminals, and wherein said third means comprises means for reducing the effective irradiated power contained in signals transmitted by transmitting terminals associated with all the links of said channel and, thereafter, increasing the effective irradiated power contained in signals transmitted by those transmitting terminals associated with links at receiving terminals for which the level of said prescribed beacon signal as received thereby is equal or above a preselected threshold.

56. A system according to claim 55, wherein said third means includes means for selectively increasing the effective irradiated power contained in signals transmitted by those transmitting terminals associated with links at receiving terminals for which the level of said prescribed beacon signal as received thereby is less that a prescribed threshold.

57. A system according to claim 54, wherein said third means comprises means for reducing the attenuation settings of the ALPC attenuators of selected ones of said transmitting terminals for which the quality of signals monitored by said first means is less than a prescribed quality and for which the attenuation settings monitored by said second means are above a prescribed setting.

58. For use in an adaptive link power control (ALPC) satellite communications network wherein signals conveyed over a communications channel between transmitting and receiving terminals are amplified by a satellite amplifier device the power availability of which is controlled to meet the demands of the links of the channel, a system for controlling the amplification of signals relayed by said satellite amplifier device in the presence of signal amplification degradation causing conditions in links of said channel comprising:
   first means for monitoring a signal representative of the signal amplification state of said satellite amplifier device;
   second means, responsive to the signal monitored by said first means having a characteristic indicative of the onset of a signal amplification degradation state of said satellite amplifier device, for selectively adjusting a prescribed characteristic of signals conveyed from said transmitting links to said satellite amplifier device;
   third means for monitoring the quality of signals received at said receiving terminals; and
   fourth means, coupled to said first and third means, and responsive to the quality of signals monitored by said third means being less than a prescribed quality and in response to the signal monitored by said first means being representative that the level of the signal amplification state of said satellite amplifier device is above a prescribed level, for adjusting the effective irradiated power contained in signals transmitted by selected ones of said transmitting terminals.

59. A system according to claim 58, wherein said first means comprises means for monitoring a signal representative of the effective irradiated power contained in the signals conveyed from said transmitting terminals to said satellite amplifier device.

60. A system according to claim 59, wherein said second means comprises means for selectively limiting the effective irradiated power contained in signals conveyed from said transmitting terminals to said satellite amplifier device.

61. A system according to claim 60, wherein said second means comprises means for selectively limiting the effective irradiated power contained in signals conveyed from said transmitting terminals to said satellite amplifier device in response to a prescribed rate of change of said effective irradiated power.

62. A system according to claim 61, wherein said prescribed rate of change of said effective irradiated power corresponds to the rate of change of said effective irradiated power exceeding attaining a predetermined threshold for a predefined period of time.

63. A system according to claim 58, wherein signals to be conveyed from a transmitter terminal to said satellite amplifier device are coupled through an ALPC attenuator associated with said terminal for controllably adjusting the effective irradiated power contained in signals conveyed therefrom to said satellite amplifier device, and wherein said first means comprises means for monitoring, for a respective communication link, the attenuation setting of said ALPC attenuator.

64. A system according to claim 63, wherein said second means comprises means for selectively limiting the attenuation settings of the ALPC attenuators associated with the transmitter terminals of said network, thereby selectively limiting the effective irradiated power contained in the signals conveyed from said transmitting terminals to said satellite amplifier device.

65. A system according to claim 59, wherein said fourth means comprises means for reducing the effective irradiated power contained in signals transmitted by transmitting terminals associated with all the links of said channel and, thereafter, increasing the effective irradiated power contained in signals transmitted by those transmitting terminals associated with links other than those links for which the quality of signals monitored by said third means is less than a prescribed quality and for which the effective irradiated power contained in signals monitored by said first means is above a prescribed level.

66. A system according to claim 65, wherein said fourth means includes means for selectively increasing the effective irradiated power contained in signals transmitted by those transmitting terminals associated with links for which the quality of signals monitored by said third means is less than a prescribed quality for which the effective irradiated power contained in signals monitored by said first means is above a prescribed level.

67. A system according to claim 59, wherein a prescribed beacon signal is transmitted from said satellite to said receiving terminals, and wherein said fourth means comprises means for reducing the effective irradiated power contained in signals transmitted by transmitting terminals associated with all the links of said channel and, thereafter, increasing the effective irradiated power contained in signals transmitted by those transmitting terminals associated with links at receiving terminals for which the level of said prescribed beacon signal as received thereby is equal or above a preselected threshold.

68. A system according to claim 67, wherein said fourth means includes means for selectively increasing the effective irradiated power contained in signals transmitted by those transmitting terminals associated with links at receiving terminals for which the level of said prescribed beacon signal as received thereby is less that a prescribed threshold.

69. For use in an adaptive link power control (ALPC) satellite communications network wherein signals conveyed over a communications channel between transmitting and receiving terminals are amplified and relayed by a satellite amplifier device the power availability of which is controlled to meet the demands of the links of the channel, a method of preventing said satellite amplifier device from being driven to a signal amplification degradation state by adaptive link power control, in response to the attenuation of a signal relayed by said satellite amplifier device between said transmitting and receiving terminals, comprising the steps of:
 (a) monitoring the quality of signals conveyed over said communications channel by way of said satellite amplifier device;
 (b) in response to a prescribed condition of said communications channel, causing an increase in the power of signals conveyed over communications channel by way of said satellite amplifier device; and
 (c) in response to step (a) detecting a decrease in quality of signals with an increase in signal power in step (b), controllably preventing a further increase in signal power by step (b).

* * * * *